July 1, 1930.  C. H. BEAL ET AL  1,769,100

GONIOMETER

Original Filed July 7, 1925

Inventors.
Carl H Beal & Charles E Miller
by Miller, Henry & Boykin
Attorneys.

UNITED STATES PATENT OFFICE

CARL H. BEAL, OF SAN MATEO, AND CHARLES E. MILLER, OF LOS ANGELES, CALIFORNIA, ASSIGNORS TO WESTERN COMPANY, A CORPORATION OF NEVADA

GONIOMETER

Substitute for application Serial No. 41,929, filed July 7, 1925. This application filed August 12, 1929. Serial No. 385,399.

Our invention relates to improvements in radio goniometers employing loop antenna and the principal object is to determine the plane of an electro-magnetic field with respect to a base line, and this application takes the place of our application for the same invention filed under Serial No. 41,929 July 7, 1925.

A further object is to determine the plane of an electro-magnetic field with respect to a base line at a plurality of points over any given area whereby distortions of the electro-magnetic field at any point of observation with respect to the base line are readily observed.

A further object is to provide a goniometer of medium weight, great accuracy, simplicity, compactness, and portability adapted to secure accurate and rapid observations and determinations of radio goniometric bearings.

These observations we attain by mounting a loop antenna rigidly with respect to, and in combination with all of the elements of a radio receiving apparatus; thus forming a single and complete receiving unit. This unit is mounted upon a stand having a vertical axis of rotation and means for determining relative angularity between a base line and any adjusted position of the loop antenna.

We also prefer, although not always necessary, to provide a horizontal axis of adjustment with angle measuring means therefor, whereby the dip or angle of the plane of the loop antenna may be determined at any angle from the vertical.

The complete receiving unit is mounted between standards such as those of an ordinary surveying transit, retaining the vertical axis movements and graduations, the compass needle and usual attachments which enable the entire unit to be rotated about the vertical axis and any angle with the base line to be most readily determined.

Referring to the accompanying drawing our invention will be made clear.

Figure 1:
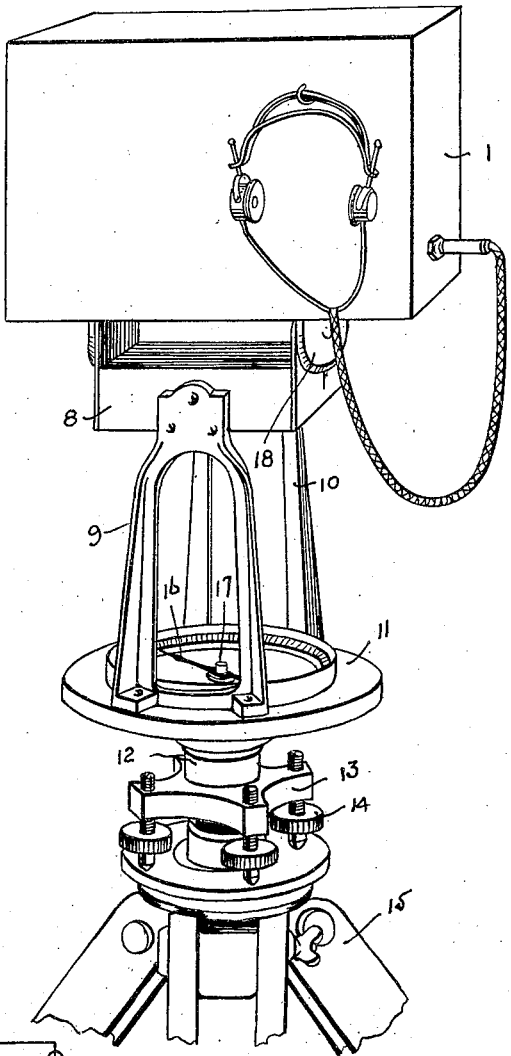
Fig. 1 is a perspective side view of our receiving unit mounted between the uprights, or standards of an ordinary transit.
Figure 2:
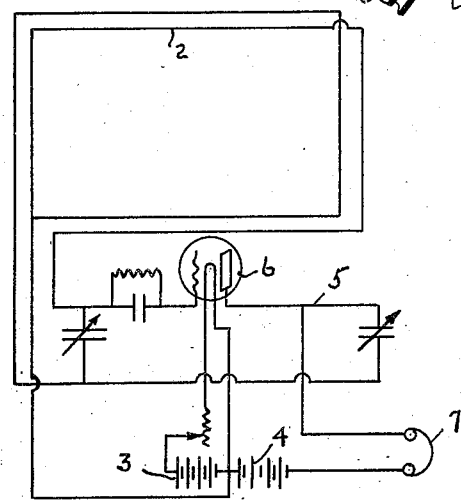
Fig. 2 is a diagrammatic showing of one form of circuit connnection of the said receiving unit.

The numeral 1 illustrates a casing within which is mounted a complete receiving unit which may advantageously have the several parts diagrammatically shown in Fig. 2, and consisting of a loop antenna with any number of loop coils 2, batteries 3, 4, detector circuit and connections 5, detector tube 6 and ear phones 7, all on a radio frequency loop circuit as shown.

For the loop antenna 2 we have found satisfactory results to be obtained when using from 25 to 250 turns of wire wound in flat coils substantially 10 by 14 inches, depending on the wave lengths, distances and intensity of the signals.

The complete unit 1 is mounted upon a block 8 which in turn is carried by the standards 9, 10 from the plate 11.

The plate 11 is rotatively mounted on the vertical support 12, which latter is carried by the conventional level head 13 having adjustments 14 and tripod stand 15 whereby the plate 11 may be levelled in any position of set up.

At 16 is provided a magnetic needle also mounted on the axis 17 about which the plate 11 is free to rotate.

Other adjustments, clamp screws, verniers and the like, well known but not shown may be employed.

We prefer also to mount the unit 1 on a horizontal axis terminating in a graduated head 18 whereby the unit may be tipped with respect to a vertical and the angle formed by the loop 2 with a vertical line may also be readily obtained.

It will now be seen that by rotating the plate 11 the loop 2 contained in the unit 1 may be made to occupy any horizontal angle with respect to the magnetic needle 16 or any predetermined base line, and as all of the receiving set parts are mounted rigidly with respect to the loop antenna 2 there will be no errors introduced or corrections necessary in any readings found, because of disturbances which would otherwise be introduced due to relative movement between the loop and parts of the receiving set.

The operation is as follows:

Assume that it is desired to establish records of distortions in the electromagnetic field at a plurality of points over any given area, the said fields being propagated by radio emanations from a distant station.

The receiving set in our goniometer is tuned to receive the said emanations and the receiving unit including its loop antenna is set up successively over each of the points to be investigated with the instrument adjusted with the axis of rotation vertical and with the loop antenna therefore vertical. Radio signals are thereupon received with greater or less intensity depending upon the angle between the plane of said loop and of the electro-magnetic field at the point of investigation.

The said loop is now rotated about the vertical axis until the received signals are of minimum intensity and a reading is now taken whereby there is established a definite angle with reference to any predetermined base line, as for example the direction of the radio sending station.

It will thus be seen that if a series of such measurements be taken over any given area and the angles of the electro-magnetic fields plotted for a number of points, any distortions from the normal or average field; that is, any distortions from a plane at right angles to the direction of the receiving station, will at once be made apparent.

We have shown in Fig. 2, one form of radio receiving apparatus, but we do not wish to be understood as confining ourselves to any particular type or hook-up as any form may be employed to suit the taste and requirements of those skilled in the art or the local conditions, wave length, etc.

Reference is herein made to our co-pending application Serial No. 41930, filed July 7, 1925, on "process for determining the location of substances having a different electrical conductivity from surrounding media," wherein is fully set forth one method of employing the herein described goniometer.

We claim:

1. A radio goniometer comprising a loop antenna in combination with a radio receiving set complete with battery current supply means rigidly mounted therewith and forming with said antenna a complete radio receiving unit, said unit mounted rotatably on a substantially vertical axis and means determining the degree of rotation of said unit with respect to a base measurement, a horizontal axis between said complete radio receiving unit and said vertical axis and graduations thereon and clamping means therefor.

2. A radio goniometer comprising a loop antenna in combination with a radio receiving set complete with battery current supply means rigidly mounted therewith and forming with said antenna a complete radio receiving unit, said unit mounted rotatably on a substantially vertical axis and means for determining the degree of rotation of said unit with respect to a base measurement, a horizontal axis between said complete radio receiving unit and said vertical axis and graduations thereon and clamping means therefor, a supporting stand and leveling screws for adjusting said axis to vertical.

3. A radio goniometer comprising a loop antenna in combination with a radio receiving set rigidly mounted therewith and forming with said antenna a complete radio receiving unit with all radio frequency elements of the receiving circuit located so as to constitute a closed loop circuit, said unit mounted rotatably on a substantially vertical axis, with the plane of the said loop substantially vertical, and means determining the degree of rotation of said unit with respect to a base measurement, a horizontal axis between said unit and said vertical axis and graduations thereon and clamping means therefor.

4. A radio goniometer comprising a loop antenna in combination with a radio receiving set rigidly mounted therewith and forming with said antenna a complete radio receiving unit with all radio frequency elements of the receiving circuit located so as to constitute a closed loop circuit, said unit mounted rotatably on a substantially vertical axis, with the plane of the said loop substantially vertical, and means determining the degree of rotation of said unit with respect to a base measurement, a horizontal axis between said unit and said vertical axis and graduations thereon and clamping means therefor, a supporting stand and leveling screws for adjusting said axis to vertical.

5. A radio goniometer comprising a loop antenna with a radio receiving set rigidly mounted therewith and forming with said antenna a complete radio receiving unit, wherein all inductive elements of the radio frequency circuits remain constant and incapable of any variation or relative displacement either electrically or mechanically during the adjustment or operation of the set, said unit mounted rotatably on a substantially vertical axis and means determining the degree of rotation of said unit with respect to a base measurement, a horizontal axis between said complete radio receiving unit and said vertical axis and graduations thereon and clamping means therefor.

CARL H. BEAL.
CHARLES E. MILLER.